(12) United States Patent
McGee et al.

(10) Patent No.: US 6,939,602 B2
(45) Date of Patent: Sep. 6, 2005

(54) COATING FOR THE ADHESIVE-RECEIVING SURFACE OF POLYMERIC LABELS

(75) Inventors: Dennis E. McGee, Penfield, NY (US); Kevin A. Kirk, Farmington, NY (US); W. Robert Osgood, Jr., Farmington, NY (US)

(73) Assignee: ExxonMobil Oil Corporation, Irving, TX (US)

(*) Notice: Subject to any disclaimer, the term of this patent is extended or adjusted under 35 U.S.C. 154(b) by 0 days.

(21) Appl. No.: 10/335,612

(22) Filed: Dec. 31, 2002

(65) Prior Publication Data

US 2004/0126514 A1 Jul. 1, 2004

(51) Int. Cl.[7] .............................................. B32B 27/32
(52) U.S. Cl. ....................... 428/220; 428/341; 428/461; 428/516; 428/688; 428/689
(58) Field of Search ................................ 428/220, 341, 428/461, 516, 688, 689

(56) References Cited

U.S. PATENT DOCUMENTS

| | | |
|---|---|---|
| 3,598,642 A | 8/1971 | Huang et al. |
| 4,377,616 A | 3/1983 | Ashcraft et al. |
| 4,749,616 A | 6/1988 | Liu et al. |
| 5,194,324 A | 3/1993 | Poirier |
| 5,380,587 A | 1/1995 | Musclow et al. |
| 5,382,473 A | 1/1995 | Musclow et al. |
| 5,451,460 A | 9/1995 | Lu et al. |
| 5,491,013 A | 2/1996 | Holley |
| 6,025,059 A | 2/2000 | McGee et al. |
| 6,048,608 A | 4/2000 | Peet et al. |
| 6,306,242 B1 | 10/2001 | Dronzek |
| 2001/0035265 A1 | 11/2001 | Dronzek |
| 2001/0036542 A1 | 11/2001 | Marks |
| 2002/0146520 A1 | 10/2002 | Squier et al. |
| 2003/0172559 A1 * | 9/2003 | Squier ..................... 40/299.01 |
| 2004/0081776 A1 * | 4/2004 | Squier et al. .............. 428/34.1 |

FOREIGN PATENT DOCUMENTS

| | | | |
|---|---|---|---|
| EP | 233 703 | 11/1991 | |
| EP | 232 040 | 11/1992 | |
| EP | 405 248 | 7/1994 | |
| EP | 606 765 A | 7/1994 | |
| EP | 0782932 A1 * | 7/1997 | ............ B41M/5/00 |
| JP | 02164527 A * | 6/1990 | ............ B23B/5/18 |

OTHER PUBLICATIONS

"Laponite JS Product Data Sheet", XP002247015; 2001, Retrieved from the Internet.

* cited by examiner

*Primary Examiner*—Sandra M. Nolan-Rayford
(74) *Attorney, Agent, or Firm*—Rick F. James

(57) ABSTRACT

This invention provides a coated thermoplastic film label comprising a first skin layer comprising a thermoplastic wherein the first skin layer has a first side and a second side, wherein the first skin layer is voided and wherein the first side has an open-cell structure; a core layer comprising a polyolefin, wherein the core layer has a first side and a second side, and the first side of the core layer is adjacent to the second side of the first skin layer; and a second skin layer comprising a polyolefin, wherein the second skin layer has a first side and a second side, the first side of the second skin layer is adjacent to the second side of the core layer, wherein the second side of the second skin layer has a closed-cell structure and wherein the second side is suitable for a surface treatment selected from the group consisting of flame, corona, and plasma treatment; metallization, coating, printing; and combinations thereof, and an inorganic coating on the first side of the first skin layer.

25 Claims, No Drawings

COATING FOR THE ADHESIVE-RECEIVING SURFACE OF POLYMERIC LABELS

BACKGROUND OF THE INVENTION

The present invention relates to polymeric labels and, more specifically, to polymeric labels that can be applied using water-based adhesives.

Polymeric labels are applied to a wide variety of bottles and containers to provide, for example, information about the product being sold or to display a trade name or logo. Polymeric labels can provide various advantageous characteristics not provided by paper labels, such as durability, strength, water resistance, curl resistance, abrasion resistance, gloss, translucence, and others.

For example, U.S. Pat. No. 5,194,324 issued to Poirier teaches the use of an opaque, biaxially oriented polymeric label stock structure. This structure includes an opaque thermoplastic polymer matrix core layer, a high-gloss medium-density polyethylene first skin layer, and a second thermoplastic polymer skin layer with an adhesive on its surface. The core layer has a stratum of closed-cell voids that gives the structure its opacity. Poirier discloses that the adhesive could be pressure sensitive, activated by water (for hydrophilic adhesive coatings), or activated by solvent (for adhesive coatings that are more hydrophobic). However, label substrates of this kind are unsuitable for some types of conventional manufacturing techniques.

For example, the application of paper labels to glass and plastic containers using water-based adhesives is still one of the most prevalent labeling techniques presently used. Consequently, there are many existing machines that have been installed for this type of labeling technique. These cut-label techniques using water-based adhesives work well with paper-based labels applied to glass, plastic, or metal substrates, because the wet adhesive wicks into the paper label, which breathes. This release of the adhesive moisture through the labels allows the adhesive to fully dry. This technique does not work, however, on polymeric labels, as described in U.S. Pat. No. 5,194,324, because the polymeric label does not permit wicking of the moisture from the adhesive when used as a decal on a window or a patch label on a container. This can make the polymeric labels prone to "swimming" or moving from the desired label location during down stream processing.

U.S. Pat. No. 6,306,242 issued to Dronzek attempts to address this problem by applying a relatively heavy hydrophilic polymeric layer (0.40 to 13 g/m2) to the plastic label to absorb a portion of the water from the water-based adhesive. However, hydrophilic coatings or a coextruded hydrophilic layer tends to absorb water from the atmosphere in humid conditions thereby hindering the ability of the hydrophilic layer to bond with the adhesive layer. In addition, the hydrophilic layer can lose water to the atmosphere in dry conditions. This gain and loss of moisture can cause the label to curl thereby hindering label application. Moreover, humidity-induced curl can create severe processing problems when converting roll stock into sheets.

U.S. Publication 2001/0036542 A1 submitted by Marks describes a multi-layer, metallizable, white opaque film suitable for use in forming metallized plastic labels for bottles and other containers. The publication describes a structure containing an internal core layer, preferably free of void-creating additives, and opposed outer skin layers. The publication further describes that one of the outer skin layers is a non-voided layer having a surface treated to receive a metal layer thereon and the opposed outer skin layer includes an amount of a void creating additive to provide sufficient porosity for the absorption of an aqueous cold glue adhesive of the type employed to adhere a label to a container. Similarly, multi-layer cavitated structures described in U.S. application Ser. No. 09/770,960, published as U.S. 2002/0146520 on Oct. 10. 2002. and metallized refinements of this structure (U.S. Application filed by ExxonMobil on Dec. 30, 2002 which is a continuation-in-part of U.S. application Ser. No. 10/098,806, published as U.S. 2003/0172559 on Sep. 18, 2003) describe a thermoplastic label comprising a closed-cell core and a non-cavitated printable surface and an open-cell opposing surface with enough porosity for the absorption of an aqueous cold-glue adhesive of the type employed to adhere a label to a container. These films perform well as labels when attached to containers with aqueous-based cold glues. However, these films may present difficulties in manufacturing and processing. For example, these films may perform poorly in presses which require substrates in sheet form. In particular, the conversion of these films from roll stock into sheets, and the stacking of the sheets and subsequent feeding through a printing press may present difficulties.

There is therefore a need in the art for a polymeric label that can be applied using conventional techniques involving a water-based adhesive without the drawbacks associated with thick hydrophilic coatings/layers. There is a further need in the art for a polymeric label/water-based adhesive combination which provides good initial tack and allows complete drying of the adhesive in less time than conventional polymer label/water-based adhesive combinations while still allowing for efficient processing during sheeting, printing, and bottling operations.

SUMMARY OF THE INVENTION

The present invention relates to thermoplastic film labels which are coated on one side with an inorganic coating. These film labels include a first skin layer, a core layer and a second skin layer.

The first skin layer includes a thermoplastic which is voided. The first skin layer has a first side and a second side. This first side has an open-cell structure. Preferably, the thermoplastic of the first skin layer is polypropylene or polyethylene.

The core layer includes a polyolefin, such as polypropylene or polyethylene. This core layer has a first side and a second side. The first side of the core layer is adjacent to the second side of the first skin layer. In one embodiment, the core layer is voided.

The second skin layer includes a polyolefin, such as polypropylene, polybutylene and polyethylene. This second skin layer has a first side and a second side. The first side of the second skin layer is adjacent to the second side of the core layer. This second side has a closed-cell structure and is suitable for a surface treatment such as flame, corona, and plasma treatment; metallization, coating, printing; and combinations thereof.

The inorganic coating is on the first side of the first skin layer. This coating includes clay, such as synthetic sodium magnesium fluorosilicate and synthetic sodium hectorite; calcium carbonate; titanium dioxide; tetrasodium pyrophosphate; colloidal silica; amorphous silica; alkaline silicate salts; white bentonite; montmorillonite; talc, water glass or combinations thereof. The coating includes at least about 75 wt %, or preferably at least about 90 wt %, inorganic material.

Preferably, the inorganic coating has a coating weight in the range of about 0.05 g/m² to about 0.3 g/m², or more preferably, a coating weight in the range of about 0.08 g/m² to about 0.2 g/m². The inorganic coating forms a continuous layer, or a non-continuous layer over the first side of the first skin layer.

In one embodiment, the second side of the second skin layer is metallized or is a glossy surface that is capable of dissipating static. In one embodiment, the metallized or glossy surface is coated with a polymeric coating. In another embodiment, the second side of the second skin layer is coated with a rough, non-glossy material that is also capable of dissipating static.

The static coefficient of friction between the inorganic coated side and the second side of the second skin layer is less than about 0.45. The surface resistivities of the inorganic coated side and/or the second side of the second skin layer are less than about 14 log ohms/square at a relative humidity of at least 50%.

The thermoplastic film labels of the present invention have a thickness from about 1 mil to about 10 mils, preferably from about 3 mils to about 5 mils.

The first skin layer includes a first voiding agent (also known as a "cavitating agent"). Examples of suitable voiding agents include polyamides, polybutylene terephthalate, polyesters, acetals, acrylic resins, nylons, solid preformed glass spheres, hollow preformed glass spheres, metal beads, metal spheres, ceramic spheres, calcium carbonate, cyclic olefin polymers, cyclic olefin copolymers, and mixtures thereof.

Preferably, the first voiding agent makes up from about at least 25% to at least about 50% by weight of the first skin layer. In one embodiment, the first voiding agent preferably has a median particle size of about 1 to about 5 microns.

In one embodiment, the thermoplastic film labels of the present invention further include a first tie layer and/or second tie layer. These tie layers include polypropylene.

The first side of the first tie layer is adjacent to the second side of the first skin layer; and the first side of the core layer is adjacent to the second side of the first tie layer. The second side of the second tie layer is adjacent to the first side of the second skin layer; and the second side of the core layer is adjacent to the first side of the second tie layer.

In another embodiment, the present invention includes containers having thermoplastic film labels. These containers include a surface of the container; a water-based adhesive adjacent to the surface; and a coated thermoplastic film label. The coated thermoplastic film label is as described above. The first side of the first skin layer is the water-based adhesive-receiving layer of the film label.

The coated thermoplastic film labels of the present invention provide several advantages over currently used paper and polymeric labels.

For example, the present invention provides polymeric labels in combination with water-based adhesives that provide good adhesive characteristics, and avoid the difficulties encountered in the prior art when using a water-based adhesive in combination with a polymeric label. Additionally, the present invention provides polymeric labels which can be manufactured more easily than currently used polymeric labels. For example, the rate at which roll stock can be converted into sheets and the rate at which sheets can be processed info printed labels are significantly improved.

DETAILED DESCRIPTION OF THE INVENTION

The thermoplastic film labels of the present invention are coated on one side with an inorganic coating. The inorganic coating imparts coefficient of friction and anti-static properties that enhance the manufacturability of coated labels. These coated labels can be applied to containers using water-based adhesives. With such adhesives, these coated labels unexpectedly retain good adhesive properties under various conditions, including wet conditions.

In one embodiment, these film labels comprise three layers, that is, a first skin layer, a core layer and a second skin layer. The core layer is the interior of these labels.

The first skin layer includes a thermoplastic that is voided (i.e., cavitated). The first skin layer has a first side and a second side. This first side has an open-cell structure. This first side is the adhesive-receiving layer of the label film. Preferably, the first skin layer is on the order of 15 to 25 gauge units (3.8 to 6.4 microns) in thickness.

Preferably, the thermoplastic of the first skin layer comprises polypropylene or polyethylene. In one embodiment, the polypropylene of the first skin layer is a homopolymer polypropylene. Examples of suitable polypropylenes include a standard film-grade isotactic polypropylene or a highly crystalline polypropylene. An example of a suitable polyethylene is high density polyethylene.

In another embodiment, the first skin layer comprises copolymers of polypropylene including comonomers of $C_{10}$ or less in an amount less than 50% by weight of the copolymer, and blends of said polypropylene homopolymers and polypropylene copolymers.

This first skin layer is heavily voided with a suitable first voiding agent to provide a desired level of porosity for absorption of moisture from aqueous adhesives. In particular, a voiding agent forms the open-cell structure of the first side, that is, the surface of the first skin layer. "Open-cell" refers to the surface voids, or "holes," or "pores," formed by the voiding agents. Voiding agents include cavitating agents, foaming agents or blowing agents.

Examples of suitable first voiding agents include polyamides, polybutylene terephthalate, polyesters, acetals, acrylic resins, nylons, solid preformed glass spheres, hollow preformed glass spheres, metal beads, metal spheres, ceramic spheres, calcium carbonate, COCs (cyclic olefin polymers and cyclic olefin copolymers), silicon dioxide, aluminum silicate and magnesium silicate and mixtures thereof. COCs are described in U.S. Pat. No. 6,048,608 issued to Peet et al.; this patent is incorporated herein by reference in its entirety.

In one embodiment, the first voiding agent comprises at least about 20 percent by weight, at least about 25 percent by weight, at least about 35 percent, at least about 40 percent by weight, or at least about 50 percent by weight of the first skin layer.

In one embodiment, the median particle size of the voiding agent is in the 1- to 5-micron particle size range, more preferably in the 1- to 2-micron particle size range. For example, in one embodiment, the median particle size of the voiding agent is at least about 1.4 microns. In another embodiment the median particle size of the voiding agent is at least about 3.2 microns.

In preferred embodiments of this invention, the voiding agent employed is calcium carbonate in the 1- to 5-micron particle size range. More preferably the calcium carbonate employed is of a 1- to 2-micron particle size and is present in an amount of about 20% to about 60% by weight of the first skin layer. For example, the quantity of 1- to 2-micron calcium carbonate is at least 25%, at least 35%, or at least 40%. The upper quantity limit of the 1–to 2–micron calcium carbonate is, for example, 55% or less; or no more than 50%.

All percentages of calcium carbonate referred to herein are by weight, based on the total weight of the voided skin layer including the calcium carbonate therein.

Suitable voiding agents (i.e. cavitating agents) and voided skin layers (i.e. cavitated skin layers) are described in U.S. application Ser. No. 09/770,960, published as U.S. 2002/0146520 on Oct. 10, 2002, and U.S. application filed by ExxonMobil on Dec. 30, 2002 which is a continuation in part application of U.S. Ser. No. 10/098,806, published as U.S. 2003/0172559 on Sep. 18, 2003. Such descriptions are incorporated herein by reference.

When measured with an M2 Perthometer equipped with a 150 stylus from Mahr Corporation, the average surface roughness ($R_a$) of the first skin layer is typically greater than 0.5 microns. $R_z$, which weighs larger peaks more heavily, is typically greater than 4 microns.

The core layer comprises a polyolefin and has a first side and a second side. The first side of the core layer is adjacent to the second side of the first skin layer. Preferably, the core layer has a thickness of approximately 50 to approximately 950 gauge units (13 to 240 microns); however, for better economics, the more preferred thickness of the core layer is between about 50 to about 350 gauge units (13 to 90 microns).

In one embodiment, the core layer comprises polypropylene. Preferably, the polypropylene of the core layer is either isotactic or high crystalline polypropylene. In another embodiment, the core layer comprises polyethylene. Preferably, the polyethylene is high-density polyethylene. In another embodiment, the core layer is a mini-random copolymer having a low-ethylene content on the order of 1% or less.

In one embodiment of this invention, void creating additives are completely omitted from the core. In such embodiment, non-void creating additives, such as titanium dioxide can be included in the core layer to enhance opacity.

In preferred embodiments, the core layer is voided. An example of such a core layer is described in U.S. Publication No. 2002/0146520, issued as U.S. Pat. No. 6,406,659 to Lang et al. In these embodiments, the core layer includes a second voiding agent, i.e. a second cavitating agent. The second voiding agent can be one or more of the following: polyamides, polybutylene terephthalate, polyesters, acetals, acrylic resins, solid preformed glass spheres, hollow preformed glass spheres, metal beads, metal spheres, ceramic spheres, calcium carbonate, COCs (cyclic olefrn polymers and cyclic olefin copolymers), and mixtures thereof. COCs are described in U.S. Patent No. 6,048,608 issued to Peet et al.; this patent is incorporated herein by reference in its entirety.

If the second voiding agent has a median particle size of 1.5 microns or less, then, when the second skin layer is metallized, a bright mirrored appearance will result.

The second skin layer comprises a polyolefin and has a first side and a second side. The first side of the second skin layer is adjacent to the second side of the core layer. Preferably, the second skin layer is on the order of 10 to 25 gauge units (2.5 to 6.4 microns) in thickness.

Suitable polyolefins for the second skin layer include polyethylene, polypropylene, polybutylene, polyolefin copolymers, and mixtures thereof.

The second side of the second skin layer is not voided, or has a closed-cell structure. This side is suitable for a surface treatment such as flame, corona, and plasma treatment; metallization, coating, printing; and combinations thereof.

The second skin layer is preferably treated in a well known manner to improve surface adhesion. The most preferred treatment in this invention is a corona treatment process. In an exemplary embodiment of this invention, the skin layer intended to receive the metallized coating has a thickness of approximately 20 gauge units (5 microns) or less.

The first side of the first skin layer (that is, the adhesive-receiving layer) has an inorganic coating. Preferably, the inorganic coating has a coating weight in the range of about 0.05 $g/m^2$ to about 0.3 $g/m^2$, or more preferably, a coating weight in the range of about 0.08 $g/m^2$ to about 0.2 $g/m^2$.

The primary components of these coating materials are naturally occurring or synthetic water-dispersible minerals. Thus the inorganic coatings are hydrophilic; however, unlike the hydrophilic adhesive claimed by Dronzek in U.S. Pat. No. 6,306,242, the relatively thin inorganic coating of the present invention is incapable of absorbing or releasing as much moisture. Therefore, this inorganic coating is not as prone to humidity-dependent curling. Moreover, the inorganic coating is comprised of components having a low molecular weight (that is, they are not polymer resins as claimed by Dronzek) and they do not function as adhesives.

Examples of components of the inorganic coating materials include one or combinations of the following: clay (all phyllosilicates including chlorites, illites, kaolins, and montmorillonites), such as synthetic sodium magnesium fluorosilicate, synthetic sodium hectorite, white bentonite, montmorillonite, and talc; calcium carbonate; titanium dioxide; tetrasodium pyrophosphate; colloidal silica; amorphous silica; water glass (sodium, potassium, and/or lithium silicates) and alkaline silicate salts.

An example of a sodium magnesium fluorosilicate is Laponite JS, from Southern Clay. Laponite JS is a synthetic layered silicate comprising tetrasodium pyrophosphate in addition to the sodium magnesium fluorosilicate. Examples of synthetic sodium hectorite include Laponite RD, Laponite D, and similar grades. Examples of white bentonite clay are Polargel NF and Polargel T from American Colloid Company.

Additionally, these inorganic coatings can include optional adjuvants such as volatile wetting agents, surfactants, salts, waxes, and other coatings known in the art having anti-static properties and/or COF-lowering properties. When the inorganic coating is in dry form, greater than 75 wt %, greater than 80 wt %, greater than 85 wt %, greater than 90 wt % or greater than 95 wt % of the dry inorganic coating comprises inorganic materials. In preferred embodiments, the inorganic coatings comprise at least 90% inorganic material when the coating is dry.

The coating can be applied to the open-cell surface by any means known in the art including, but not limited to, spraying, dipping, direct gravure, reverse direct gravure, air knife, rod, and offset methods. In one embodiment, the inorganic coating is in the form of a continuous layer. That is, the inorganic coating does not have substantial gaps or holes in its coverage of the first skin layer. In another embodiment, the inorganic coating is in the form of a non-continuous coating, such as for example, in the form of a geometric or artistic pattern. Even random distribution of the coating (characteristic of imperfect wetting) can be acceptable in some instances.

It has been found that the amount of the inorganic coating material present on the surface of the first skin layer is important to achieve desirable results. That is, the surface resistivity of the films is lowered (which means that the coating can dissipate a static charge more quickly) while the performance of water based adhesive is not impaired. In particular, the rate at which the water based adhesive tacks up is not decreased, and the adhesion of labels to bottles after conditioning in an ice chest is not severely degraded when compared to uncoated water based adhesive label stock It is surprising that these results are achieved by coating the adhesive-receiving surface of film labels since the most effective way to lower surface resistivity is to form a continuous layer of the inorganic coating. It would have been expected that a continuous layer of water-sensitive material would readily break down in water, for example in an ice chest, and thus cause degradation in adhesion. This degradation does in fact occur if too much coating is applied to the adhesive-receiving layer.

The precise amount of the inorganic coating that is present on the surface of the film substrate is not easily determined, because preferred substrates tend to lose cavitating agent from the open-celled surface when rubbed. However, in one embodiment, coating weights can be approximated by rinsing a piece of coated film having a known area and weight under a gentle flow of water with light rubbing using a non-abrasive material like a wet examination glove. After drying, the weight change can be measured, and the approximate coating weight calculated.

The presence of the coating material in a preferred amount greatly improves the rate at which the label films of the present invention can be processed compared to uncoated films. The efficiency of the following process steps are improved: sheeting, cutting and/or die cutting during printing/converting processes that include: 1) feeding into presses such as wide-web sheet-to-sheet or roll-to-sheet offset lithography, web UV offset, or other type of conventional press and 2) web presses for printing such as a narrow-web or wide-web flexographic or gravure in-line press that allows for a roll-to-sheet rotary cutting and stacking process.

For example, during the sheeting process these coated films allow for overlapping (i.e. "shingling") of the individual sheets. Overlapping during the sheeting process provides a higher output rate than would be provided without overlapping. One way that overlapping effects this result is by the slowing down the belts of the sheeter. For example, an 80% overlap would slow the belt down to one-fifth of the speed. The speed of the belts is important because as the cut sheets are being carried on the belts, higher speeds increase the potential for air to catch and lift a corner of a film. Thus, sheets processed at higher speeds are more likely to have Holdovers and wrinkles. Also, the most critical of the film-processing steps is the stacking at the end of the machine. At this point, the film is pushed through the air, then decelerates as it slides across the sheet below it, and then comes to an abrupt stop as it hits the backstop of the stacking table. The faster the film is traveling when it hits the backstop, the harder it hits, and the more likely it is to wrinkle. By slowing the film speed down, the occurrence of such problems decreases.

In addition, overlap also increases the effective thickness of film traveling through the sheeter. With the increased effective thickness comes increased effective stiffness which also minimizes the wrinkling of the films.

In one embodiment, the second side of the second skin layer is metallized. In another embodiment, this second side does not contain metal, but is glossy. In both these embodiments, the surfaces of the second skin layers are capable of dissipating static. The surface resistivity is less than 14 log ohms per square when the relative humidity is greater than 50% and the metallized surface is reflective or the gloss is >30% when measured with a BYK Gardner Micro-gloss 20° meter. Adequate gloss and metallic sheen can be obtained from using a base film which is uniaxially or biaxially oriented, and which has a second side that contains only closed-cell voids or no voids at all. Such a base film provides a smooth second side which is glossy. In the metallized embodiment, metal, such as aluminum, is deposited on this smooth second side. In one embodiment, to further enhance gloss or to preserve metallic sheen, a smooth clear polymeric coating is applied over the smooth second side, or over the metallic layer deposited on the smooth second side. This polymeric coating can be applied by any means known in the art including, but not limited to, application of polymeric material dispersed in water or dispersed in a solvent, and extrusion coating.

The smooth surfaces of the second side of the second skin layer preferably have an average roughness ($R_a$) between 0.1 and 0.3 microns before metallization. ($R_a$ was measured with an M2 Perthometer from Mahr Corporation equipped with a 150 stylus.) More preferably, the value of $R_a$ is less than 0.3 microns, with $R_a$ values less than 0.15 being most preferred. When sheets of label film stock are so smooth, the sheets can be very difficult to separate once all the air gets pressed from between them by the weight of the sheets in a stack. When this occurs, it can be very difficult to separate the sheets when trying to feed them into a printing press. Difficulty in separation occurs despite the open-cell surface of the first skin layer which is much rougher (e.g., $R_a$>0.5).

These separation difficulties have been ameliorated by the film labels of the present invention. The static coefficient of friction between the second skin layer and the inorganic coated side is less than about 0.45, more preferably less than about 0.40, and most preferably less than about 0.35. (The static coefficient of friction is measured with a 4-lb sled with a 45-second delay using a Monitor/Slip Friction™ tester Model No. 32-06 made by Testing Machines Inc., Amityville, N.Y.) This characteristic improves the ability to feed stacks of smooth sheets into the printing press without getting more than one sheet fed at a time, which causes the press to stop.

In the embodiment wherein the second side of the second skin layer is metallized, preferably, a coating is applied to the metallized surface. Such coatings provide desirable print qualities including wet-scratch resistance, machinability enhancement, and mar resistance. Suitable examples are described in U.S. Pat. No. 6,025,059 and patent application Ser. No. 10/134,969, published as U.S. 2003/0207121 on Nov. 6, 2003 (initially Ser. No. 10/131,983, now abandoned), which disclosures are incorporated herein by reference in their entireties. Additionally, a wide variety of urethanes, acrylics, polyesters, and blends thereof may also be suitable. Suitable examples are described in U.S. Pat. Nos. 5,380,587 and 5,382,473; which patents are incorporated herein by reference in their entireties.

Preferably, coatings applied to the metallized surface do not significantly diminish the bright mirrored appearance of the metallized surface. Similar coatings can be used on the second side of the second skin layer without metallizing. However, such structures would lose a significant contribution to the anti-static properties made by the metal and, depending upon the formulation of the clear coating, additional anti-static additives would probably be necessary in the coating formulation for the print face.

In a preferred embodiment, the surface resistivity of the second skin layer and the inorganic coated layer is less than about 14 log ohms/square, more preferably less than about 12 log ohms/square, and most preferably less than about 10 log ohms/square. Surface resistivity measurements are normally made with an Autoranging Resistance Indicator Model 880 from Electro-Tech Systems, Inc., Glenside, Pa., especially when measuring a surface that is metallized or that has a clear coating over the metal. However, this device cannot measure resistances above 12 log ohms. Alternatively, surface resistivity was measured using a 487 Picoammeter/Voltage Source equipped with an 8008 Resistivity Test Fixture supplied by Keithley Instruments, Cleveland, Ohio, especially when the surface resistivity exceeded 12 log ohms/square. For the measurements made with the Keithley meter, the instrument applied 500 Volts to the surface of the sample.

In another embodiment, the second side of the second skin layer is coated with a rough, non-glossy material that is capable of dissipating static. That is, the surface resistivity is less than 14 log ohms per square when the relative humidity is greater than 50%, gloss is <30% when measured with a BYK Gardner Micro-gloss 20° meter. Preferably the surface-applied coating has a roughness $R_a$ that is greater than 0.20 microns and an $R_z$ that is greater than 1.0 micron when measured with a Perthometer S2 from Mahr Corporation, Cinncinnati, Ohio, especially such a model equipped with a 150 stylus. For good print quality, the roughness $R_a$ is preferably less than 0.35 and $R_z$ is preferably less than 3.0 microns. When measured with a Messmer Parker Print-Surf Roughness and Air Permeability Tester Model ME-90, the rough coating for the second side of the second skin layer preferably has an average roughness between 0.75 and 3 microns, more preferably between 1 and 2 microns. The static coefficient of friction between the first side of the first skin layer and the rough second side of the second skin layer is less critical and can be as high as 0.70, because the roughness permits sheets to be easily separated by air-assist mechanisms available on most sheet-fed printing presses. However, having a kinetic coefficient of friction between the first and second side of less than 0.50 (measured in the same way) is advantageous in the sheeting process. It makes it easier for sheets to overlap and stack well. Suitable examples of rough, non-glossy coatings having wet-scratch resistance are described in U.S. Pat. No. 6,025,059 and patent application Ser. No. 10/134,969, published as U.S. 2003/0207121 on Nov. 6. 2003 (initially Ser. No. 10/131, 983, now abandoned), which disclosures are incorporated herein by reference in their entireties. Another example is PD900 NT from Process Resources.

In one embodiment, the thermoplastic film labels of the present invention further include a first tie layer and/or second tie layer. These tie layers include polypropylene. These tie layers preferably have a thickness of at least about 0.3 mil (0.75 microns).

The first side of the first tie layer is adjacent to the second side of the first skin layer; and the first side of the core layer is adjacent to the second side of the first tie layer. The second side of the second tie layer is adjacent to the first side of the second skin layer; and the second side of the core layer is adjacent to the first side of the second tie layer.

The thermoplastic film labels of the present invention have a thickness from about 1 mil to about 10 mils (25 to 250 microns), preferably from about 3 mils to about 5 mils (75 to 125 microns). In one embodiment the first skin layer makes up at least about 15% by weight of the thermoplastic film label. In another embodiment the first skin layer comprises at least about 30 percent by weight of the thermoplastic film label.

Preferably, the thermoplastic film labels of the present invention are biaxially oriented. In another embodiment, the film labels are uniaxially oriented.

Films described by pending U.S. application Ser. No. 09/770,960, published as U.S. 2002/0146520 on Oct. 10, 2002, and Ser. No. 10/098,806, published as U.S. 2003/0172559 on Sep. 18, 2003; and U.S. Application Ser. No. 10/331,582 filed by Exxon Mobil on Dec. 30, 2002 and published as U.S. 2003/0180490 on Sep. 25, 2003, which is a continuation-in-part of application Ser. No. 10/098,806 are suitable substrates for the inorganic coating of this invention. These aforementioned applications are incorporated herein by reference in their entireties.

Preferably, the adhesives used with the present invention are water-based adhesives, including cold glues. Water-based adhesives are well known in the art for use in combination with traditional paper labels.

Cold glues are applied to the first side of the first skin layer of the film labels of the present invention. Cold glues generally comprise solid base materials in combination with water. In one embodiment, the cold glue is an aqueous solution of a natural adhesive (e.g. casein). In another embodiment, the cold glue is an aqueous solution of a resin (e.g. PVA, EVA). Cold glues are widely used as an economical alternative to wrap around or pressure sensitive labels. Some cold glues are a colloidal suspension of various proteinaceous materials in water and are derived by boiling animal hides, tendons, or bones which are high in collagen. Alternatively, cold glue can be derived from vegetables (e.g. starch, dextrin). Some cold glues are based on synthetic materials (resins). Examples of cold glues which are suitable for the practice of the present invention include HB Fuller WB 5020, National Starch Cycloflex 14-200A, AABBITT 712-150; and Henkel Optal 10-7026; Henkel Optal 10-7300, and Henkel Optal 10-7302. The aforementioned list of cold glues contains trademarks of HB Fuller, National Starch, AABBITT, and Henkel respectively.

The film labels comprising the water based adhesive are attached to containers by means known in the art. The containers have a surface which is adjacent to the glue applied to the first side of the first skin layer of the label. Suitable materials for the container include glass, ceramics, thermoplastics, and other materials.

In another embodiment, the core layer includes a conventional filler and pigment such as titanium dioxide. Generally, from an economic viewpoint at least, it has not been considered to be of any particular advantage to use more than about 10 percent by weight of titanium dioxide to achieve a white label suitable for printing. Greater amounts could be added for greater opacity so long as there is no undue interference with achieving the desired properties of the thermoplastic label.

The film labels of the present invention can be translucent or opaque. In one embodiment, the label is white opaque. This embodiment provides an excellent contrasting background for printed material applied to the second side of the core layer or to the surface of the second skin layer of the film label. In another embodiment, the label has a transparent polypropylene core layer that has a coextruded first skin layer and second skin layer.

In another embodiment, the core layer comprises an opaque core material that is an oriented polypropylene structure cavitated in a special way so as to produce a pearlescent opaque appearance. A material of this type is described in U.S. Pat. No. 4,377,616 issued to Ashcraft et al; this patent is incorporated herein by reference in its entirety.

Other conventional additives, in conventional amounts, may be included in the film labels of the invention. Suitable other conventional additives include antioxidants, pigments, orientation stress modifiers, flame retardants, antistatic agents, antiblocking agents, anti-fog agents, and slip agents.

Another class of additives that may be included in the compositions of the invention are low molecular weight hydrocarbon resins (frequently referred to as "hard resins".) The term "low molecular weight hydrocarbon resins" refers to a group of hydrogenated or unhydrogenated resins derived from olefin monomers, such as the resins derived from terpene monomers, coal tar fractions and petroleum feedstock. Suitable such resins prepared from terpene monomers (e.g., limonene, alpha and beta pinene) are Piccolyte resins from Hercules Incorporated, Wilmington, Del., and Zonatac resins from Arizona Chemical Company, Panama City, Fla. Other low molecular weight resins are prepared from hydrocarbon monomers, as $C_5$ monomers (e.g., piperylene, cyclopentene, cyclopentadiene, and isoprene), and mixtures thereof. These are exemplified by the hydrogenated thermally oligomerized cyclopentadiene and dicyclopentadiene resins sold under the trade name Escorez (for example Escorez 5300) by ExxonMobil Chemical Company of Baytown, Tex. Others are prepared from $C_9$ monomers, particularly the monomers derived from $C_9$ petroleum fractions which are mixtures of aromatics, including styrene, methyl styrene, alpha methyl styrene, vinyl naphthalene, the indenes and methyl indenes and, additionally, pure aromatic monomers, including styrene, α-methyl-styrene and vinyltoluene. Examples of these resins include hydrogenated z-methyl styrene-vinyl toluene resins sold under the trade name Regalrez by Hercules Incorporated of Wilmington, Del.

In another embodiment, the present invention provides containers having a thermoplastic film label. These containers include a surface of the container; a water-based adhesive adjacent to the surface; and a coated thermoplastic film label. The coated thermoplastic film label is as described above. Suitable materials for the container include glass, ceramics, thermoplastics, and other materials.

It should be evident that this disclosure is by way of example, and that various changes can be made by adding, modifying, or eliminating details without departing from the fair scope of the teaching contained in the disclosure.

EXAMPLES

The following examples refer to a film produced by ExxonMobil, 85 LP200. This film is a biaxally oriented five-layer opaque film with the following structure. All percentages shown are based on weight:

| | Adhesive-receiving surface |
|---|---|
| Layer 1 (5–30%) | OPP or HCPP + 20–60% $CaCO_3$ + 0–15% Antiblock |
| Layer 2 (5–30%) | OPP or HCPP + 0–60% $CaCO_3$ |
| Layer 3 (20–85%) | OPP or HCPP + 0–15% $CaCO_3$ |
| Layer 4 (1–5%) | OPP or HCPP + 0–10% Antistat |
| Layer 5 (0.6–17%) | Propylene-ethylene copolymer Print-receiving surface (with or sans metal) |

Example 1

This example shows that the application of the coating of the present invention to a label film improves processing. In particular, conversion from roll stock into sheets, and the feeding of the sheets into a lithographic printing press to create a stack of printed labels are improved by the application of these coatings.

LS-447 is a two-side coated cavitated label film produced by ExxonMobil. The print-face coating formulation includes 100 dry parts PD900 NT from Process Resources, 2.2 parts CX-100 from Avecia, and 0.2 dry parts of NAC-116 from Process Resources. This coating is prepared at 39% solids in water and applied at a target coating weight of 3.9 g/m² by metering rod coating method. LS-447 is not suitable for use when water-based cold glues are used as adhesives. However, this material sheets well and the sheets feed, convey, and stack well on a lithographic printing press. When measured with a Messmer Parker Print-Surf Roughness and Air Permeability Tester Model ME-90, this coating has an average roughness between 1 and 2 microns. When roughness is measured with an M2 Perthometer from Mahr Corporation, $R_a$ is about 0.25 microns and $R_z$ is about 2.5 microns. When measured using a 4-pound sled and a 45-second delay, the static coefficient of friction is typically about 0.53 and the kinetic value is about 0.43. The 20° gloss is typically <10%. This example used LS-447 as a benchmark. The surface resistivity is typically less than 14 log ohms/square when the relative humidity is greater than 50%.

Film A is 85 LP200 produced by ExxonMobil coated on the print face with the same coating used to make LS-447. The open-cell backside (needed for the use of cold glue adhesives) did not have any coating.

Film B is 85 LP200 with the print face metallized and treated with a corona discharge immediately before coating with an acrylic-urethane blend (XOM-24D supplied by Process Resources). The open-cell backside did not have any coating.

Film C was the same metallized film as Film B. However, Film C had no coatings on either side, and the metal surface received no additional corona treatment.

Film D was the same as Film A (not metallized). However, the back of the film was coated with approximately 0.075 g/m² of the inorganic coating of the present invention. In particular, the only active ingredient in the coating was Laponite JS supplied by Southern Clay as a powder. The Laponite JS coating solution was prepared at 4% solids in water containing 0.5% hexyl cellosolve. The coating solution was applied via direct offset coating method. Surface resistivity of the inorganic coated surface measured 9 log ohms per square, at 40% relative humidity.

Film E was 85 LP200 with a metallized print face coated with 0.2 g/m² of a blend comprising 100 dry parts of a cationic acrylic polymer (R1117 XL from W. R. Grace), 20 dry parts high-density polyethylene wax (Michem®Emulsion 09730), 2 dry parts epoxy curing catalyst (Imicure EMI-24 from Air Products), and 1 dry part Tospearl 120 (from Toshiba Silicone Company). The open-cell backside was coated with about 0.075 g/m² of the coating of the present invention. In particular, the coating was a blend containing equal amounts of Laponite JS and Laponite RD.

The attainable sheeting speed and printing speed for each film is shown in Table 1. The sheets (28.5×40.5 inches) were converted from roll stock by Matthias Paper in Swedesboro, N.J. and printed by Hammer Lithographic in Rochester, N.Y.

TABLE 1

| Sample | Sheeting Rate | Printing (Feeding) Rate |
| --- | --- | --- |
| LS-447 | 300 fpm with overlapping | 9000 sheets/hr |
| Film A | 140 fpm, could not overlap | Would not run |
| Film B | 180 fpm, could not overlap | 6300 sheets/hr; several trip-outs when attempts were made to increase rate to 8100 sheets/hr. |
| Film C | <100 fpm, could not make sheets in an automated fashion. | Would not run. |
| Film D | 300 fpm with overlapping | 8400 sheets/hr |
| Film E | 180 fpm with overlapping (short run, machine settings were not optimized) | 7500 sheets/hr (short run, machine settings were not optimized) |

This example shows that, even with a coating on the print face that processes well in a two-side coated structure, a film with one open-celled surface does not process well during the sheeting operation or the printing operation. The ability to overlap sheets improves the efficiency of the sheeting operation.

Metallizing one side of the film enhances the conductivity of one of the surfaces and helps to mitigate static during the web-handling steps. Static is known to create problems when handling plastic substrates. However, as Film C shows, one conductive surface does not yield a substrate that is suitable for sheeting and subsequent printing processes. The surface resistivity of the uncoated open-cell surface was greater than 14 log ohms per square.

Coating the metal surface improved sheeting and feeding into a printing press a little (see Film B), but it was still not possible to overlap the sheets after they were cut from the roll stock without coating the open-cell backside (Film E). This result is surprising, because the back of 85 LP200 is very rough ($R_z$ is about 5 microns when measured with a Perthometer S2 from Mahr Federal and off scale when measured with the Messmer Parker Print-Surf Roughness and Air Permeability Tester Model ME-90) and both surfaces of the film tend to be lightly coated with calcium carbonate dust used to create the open-cell cell cavitation. However, as film E shows, overlapping is possible when both sides of the film are appropriately coated.

The sheets of Film E without the inorganic coating on the backside would not slide well over one another. Moreover, if one stacked some hand-cut sheets, they would bind to one another, much like two plates of glass having water pressed between them. Essentially, without the inorganic coating on the back, Film E would process like Film C during the printing operation.

Film D shows that the application of an inorganic coating to the open-cell surface of 85 LP200 enhances sheeting and printing efficiency of film that is not metallized. On longer runs, it is possible to increase printing speeds to more than 11000 sheets/hr.

Example 2

It is desirable that a label attached to a bottle with cold glue sit it an ice chest for prolonged periods without the label coming off the bottle. The following example shows that the amount of the inorganic coating which provides the desirable results falls within a narrow range. That is, if too much of the inorganic coating is applied to the open-cell surface of the label film, then the adhesion of the label to the bottle diminishes more quickly. Without enough inorganic coating on the back side, the label film will not process well, as noted in Example 1.

Samples were attached to glass bottles using Henkel Optal 10-7302 cold glue. The samples were not put into the ice chest until two weeks after the labels were attached to the bottles.

| Cold Glue Adhesion for Metallized 85 LP200 Coated on the Open-cell Side with Different Amounts of Laponite JS | | | | | | |
| --- | --- | --- | --- | --- | --- | --- |
| Laponite JS Coating Weight (g/m$^2$) | Initial Tack-up | 24 Hour Tack-up | 1 week Tack-up | 2 week Tack-up/Tear | 24 hr Ice Chest Tack-up/Tear/Flag | 48 hr Ice Chest Tack-up/Tear/Flag |
| 0.00 | 4 | 5 | 5 | 5/100 | 5/100/0 | 5/90/0 |
| 0.02 | 4 | 5 | 5 | 5/100 | 5/100/0 | 5/70/0 |
| 0.03 | 4 | 5 | 5 | 5/100 | 5/100/0 | 5/60/0 |
| 0.07 | 4 | 5 | 5 | 5/100 | 5/90/¼" | 3/50/¾" |
| 0.21 | 4 | 5 | 5 | 5/100 | 4/40/½" | 1/0/2" |

"Tack-up" refers to the ease with which one can move the label after it is attached to the bottle. Poorly tacked labels (a "1" rating) tend to "swim", but labels that have excellent tack (a "5" rating) a very difficult to move about on the bottle. "Tear" refers to the percentage of the label that remains attached to the container when it is peeled off. "Flagging" refers to the tendency of the label to release from the container at the edges. The length of the "flag" (0 to 3 inches) is reported.

The retained adhesion in the ice chest drops off sharply when the amount of inorganic coating on the open-cell surface goes above 0.07 g/m$^2$. However, even higher levels could be suitable for some applications where retained adhesion in an ice chest is not a requirement.

Example 3

100971 This example shows how different materials can be used to obtain good anti-static properties. However, polymeric materials tend to interfere with retained adhesion when cold-glue-applied labels were placed in an ice chest.

| | | | Ice Chest Results | | Surface Resistivity at |
| --- | --- | --- | --- | --- | --- |
| Backside Sample # | Initial Tack | 24-hr Tack | 24-hour Tack/Tear/Flag | 48-hour Tack/Tear/Flag | ~35% RH (log ohms/square) |
| I | 4 | 5 | 5/90/0 | 4/70/½" | 9.5 |
| II | 4 | 5 | 5/90/0 | 5/80/0 | 9.9 |
| III | 4 | 5 | 5/90/¼" | 5/90/¼" | 11.7 |
| IV | 4 | 5 | 3/5/¼" | 3/5/1" | 13.7 |
| V | 4 | 5 | 5/100/0 | 5/90/0 | >14 |

Backside Sample I was prepared by applying a 3.5% dispersion of Laponite JS containing 0.5% hexyl cellosolve to the open-cell side of 85 LP200 using a 130-Quad undoctored direct gravure at 30–35 feet per minute and dried in a 3-foot long oven that was set at 220° F. The approximate coating weight was 0.09 g/m².

Backside Sample II was prepared by applying a dispersion containing 2.9% Laponite JS, 0.6% Polargel NF, 0.2% Genapol UD 050, and 0.5% hexyl cellosolve to 85 LP200 using the same coating conditions as for Backside Sample I. Polargel NF is white bentonite clay. Genapol UD 050 is a surfactant. The approximate coating weight was 0.09 g/m².

Backside Sample III was prepared by applying a dispersion containing 2.8% Polargel NF, 0.7% Sylysia 740, 0.2% Genapol UD050, and 0.5% hexyl cellosolve to 85 LP200 as described for Backside Sample I. Sylysia 740 is amorphous silica gel manufactured by Fuji Silysia. The approximate coating weight was 0.09 g/m².

Backside Sample IV was prepared by applying an emulsion containing 13.6% R1117 XL (a water-resistant cationic emulsion from W. R. Grace), 0.3% Imicure EMI-24 (an epoxy curing catalyst from Air Products), 2% Lambent PD (an anti-static additive from Lambent Technologies), 4% Syloid 244 (amorphous silica gel from Grace Davison), and 0.5% hexyl cellosolve according to the procedure described for Backside Sample I. The approximate coating weight was 0.45 g/m². Backside Sample V is an uncoated control.

These results show that a thin layer of water-dispersible inorganic clay gives better retained wet label adhesion than a heavier layer of water-resistant polymer loaded with a porous grade of amorphous silica. The heavy layer of insoluble polymer evidently plugs the open cells in the substrate, thereby reducing mechanical adhesion factors that prevent adhesion degradation in a wet environment.

This example also show that one can optimize retained adhesion and anti-static properties by using different combinations of synthetic and naturally occurring clays and other additives. For example, Backside Sample III had the same ice-chest performance after 48 hours as the uncoated control (Backside Sample V), but the surface resistivity was at least 100 times lower.

Example 4

This example shows that static COF (measured using a 4-pound sled with a 45-second delay) between the print surface and the inorganic coating gives another way to characterize suitable coating combinations for metallized substrates in which the coating over the metal does not significantly detract from the bright metallic appearance of the substrate. Conceivably, one could get similar results from smooth, glossy films that have suitable anti-static properties, but that do not comprise a metallized layer.

| Metallized Samples | Qualitative Sheeting Performance | Qualitative Feeding Performance | In/Out Static COF | Surface Resistivity of Print Surface (log ohms/square at 50% RH) | Surface Resistivity of Glueable Surface (log ohms/square at 50% RH) |
| --- | --- | --- | --- | --- | --- |
| Film B | Fair (180 fpm) | Fair (6100 s/hr) | 0.50 | <3 | >14 |
| Film G | Fair (225 fpm) | Good (7500 s/hr) | 0.42 | <3 | 13.7 |
| Film C | Poor | Poor | 0.50 | <3 | >14 |
| Film E | Good (180 + overlap) | Good (7500 s/hr) | 0.41 | ~7 | ~9 |
| Film F | Fair (200 fpm) | Poor | 0.48 | ~7 | ~9 |

Films A, B, C, D and E are described in Example 1.

Film F is 85 LP200 that had been metallized on the print face. Film F was then coated on the print face with a blend comprising 100 dry parts of a cationic acrylic polymer (R1117 XL from W. R. Grace), 2 dry parts epoxy curing catalyst (Imicure EMI-24 from Air Products), and 1 dry part Tospearl 120 (from Toshiba Silicone Company). This blend was applied at 0.3 g/m² to 85 LP200 that had been metallized on the print face before coating. The open-cell backside was coated with a coating of the present invention. In particular, the coating was about 0.12 g/m² of Laponite JS. Film F could only be sheeted at about 200 fpm without being able to overlap the sheets. Film F fed poorly at the printing press because of trip outs caused by more than one sheet being fed at a time. Film F gave unacceptable results, because the coated substrate was smooth ($R_a$ was about 0.18) and reflective, but the static coefficient of friction exceeded 0.45.

Film G was the same as Film B, but Laponite JS was applied to the back of the sheet. The surface resistivity was higher than expected, because the Laponite JS solution did not wet out perfectly. Nevertheless, there was an improvement in the sheeting and feeding performance along with a reduction in the in/out COF.

What is claimed is:

1. A coated thermoplastic film label comprising:
   (a) a thermoplastic film comprising:
      (i) a first skin layer comprising a thermoplastic wherein the first skin layer has a first side and a second side, wherein the first skin layer is voided and wherein the first side has an open-cell structure;
      (ii) a core layer comprising a polyolefin, wherein the core layer has a first side and a second side, and the first side of the core layer is adjacent to the second side of the first skin layer; and
      (iii) a second skin layer comprising a polyolefin, wherein the second skin layer has a first side and a second side, the first side of the second skin layer is adjacent to the second side of the core layer, wherein the second side of the second skin layer has a closed-cell structure and wherein the second side is suitable for a surface treatment selected from the group consisting of flame, corona, and plasma treatment; metallization, coating, printing; and combinations thereof, and (b) an inorganic coating on the first side of the first skin layer, wherein said inorganic coating has a coating weight in the range of about 0.05 g/m$^2$ to about 0.3 g/m$^2$.

2. The thermoplastic label film of claim 1 wherein the inorganic coating has a coating weight in the range of about 0.08 g/m$^2$ to about 0.2 g/m$^2$.

3. The thermoplastic label film of claim 1 wherein the inorganic coating is in the form of a continuous layer on the first side of the first skin layer.

4. The thermoplastic label film of claim 1 wherein the inorganic coating is in the form of a non-continuous layer on the first side of the first skin layer.

5. The thermoplastic label film of claim 1 wherein the second side of the second skin layer is metallized or glossy.

6. The thermopasic label film of claim 5, wherein the static coefficient of friction between the inorganic coated side and the metallized or glossy second side of the second skin layer is less than about 0.45.

7. The thermoplastic label film of claim 1 wherein the surface resistivity of the inorganic coated side is less than about 14 log ohms/square when the relative humidity is at least 50%.

8. The thermoplastic label film of claim 1 wherein the surface resistivity of the metallized or glossy second side of the second skin layer is less than about 14 log ohms/square when the relative humidity is at least 50%.

9. The thermoplastic label film of claim 5 wherein the metallized second side or glossy second side of the second skin layer is coated with a polymeric coating.

10. The thermoplastic label film of claim 1 wherein the second side of the second skin layer has a rough, non-glossy coating wherein said a rough, non-glossy coating has a surface roughness ($R_a$) greater than 0.20 microns.

11. A coated thermoplastic label film according to claim 1 wherein the inorganic coating comprises calcium carbonate, titanium dioxide, sodium magnesium fluorosilicate, synthetic sodium hectorite, white bentonite, montmorillonite, tetrasodium pyrophosphate, colloidal silica, amorphous silica, talc, alkaline silicate salts, water glass or combinations thereof.

12. A coated thermoplastic label film according to claim 1 wherein the inorganic coating comprises sodium magnesium fluorosilicate and tetrasodium pyrophosphate.

13. The thermoplastic label film of claim 1 wherein the inorganic coating comprises at least about 75 wt % of inorganic material.

14. The thermoplastic label film of claim 1 wherein the inorganic coating comprises at least 90 wt % of inorganic material.

15. The thermoplastic label film of claim 1 wherein the thermoplastic of the first skin layer comprises polypropylene or polyethylene.

16. The thermoplastic label film of claim 1 wherein the polyolefin of the second skin layer comprises polypropylene, polybutylene, polyethylene, polyolefin copolymers or mixtures thereof.

17. The thermoplastic label film of claim 1 wherein the polyolefin of the core layer comprises polypropylene.

18. The thermoplastic label of claim 1 wherein the core layer is voided.

19. The thermoplastic film label of claim 1 wherein the label has a thickness from about 1 mil to about 10 mils.

20. The thermoplastic label film of claim 1 wherein the first skin layer comprises a first voiding agent selected from the group consisting of polyamides, polybutylene terephthalate, polyesters, acetals, acrylic resins, solid preformed glass spheres, hollow preformed glass spheres, metal beads, metal spheres, ceramic spheres, calcium carbonate, cyclic olefin polymers, cyclic olefin copolymers, silicon dioxide, aluminum silicate, magnesium silicate and mixtures thereof.

21. The thermoplastic film label of claim 20 wherein the first voiding agent comprises at least about 25% to at least about 50% by weight of the first skin layer.

22. The thermoplastic film label of claim 20 wherein the first voiding agent has a median particle size of about 1 to 5 microns.

23. The thermoplastic film label of claim 1 further comprising: a first tie layer comprising polypropylene wherein the first tie layer has a first side and a second side and the first side of the first tie layer is adjacent to the second side of the first skin layer; and wherein the first side of the core layer is adjacent to the second side of the first tie layer.

24. The thermoplastic film label of claim 23 further comprising: a second tie layer comprising polypropylene wherein the second tie layer has a first side and a second side and the second side of the second tie layer is adjacent to the first side of the second skin layer; and wherein the second side of the core layer is adjacent to the first side of the second tie layer.

25. A coated thermoplastic film label comprising:

(a) a thermoplastic film comprising:

(i) a first skin layer comprising oriented polypropylene or highly crystalline polypropylene, wherein the first skin layer has a first side and a second side, wherein the first skin layer further comprises calcium carbonate;

(ii) a core layer comprising oriented polypropylene or highly crystalline polypropylene, wherein the core layer has a first side and a second side, and the first side of the core layer is adjacent to the second side of the first skin layer, wherein the core layer further comprises calcium carbonate; and (iii) a second skin layer comprising a propylene-ethylene copolymer, wherein the second skin layer has a first side and a second side, the first side of the second skin layer is adjacent to the second side of the core layer, wherein the second side of the second skin layer has a closed-cell structure and wherein the second side is metallized or glossy, (iv) a first tie layer comprising oriented polypropylene or highly crystalline polypropylene, wherein the first tie layer has a first side and a second side, wherein the first side of the first tie layer is adjacent to the second side of the first skin layer; and wherein the first side of the core layer is adjacent to the second side of the first tie layer, and (v) a second tie layer comprising oriented polypropylene or highly crystalline polypropylene wherein the second tie layer has a first side and a second side wherein the second side of the second tie layer is adjacent to the first side of the second skin layer; and wherein the second side of the core layer is adjacent to the first side of the second tie layer, and (b) an inorganic coating on the first side of the first skin layer, wherein said coating comprises sodium magnesium fluorosilicate and tetrasodium pyrophosphate.

* * * * *